MARIUS-PAUL OTTO.
TREATMENT OF WOOD FOR SEASONING IT.
APPLICATION FILED MAY 22, 1919.
1,381,656.
Patented June 14, 1921.
2 SHEETS—SHEET 1.
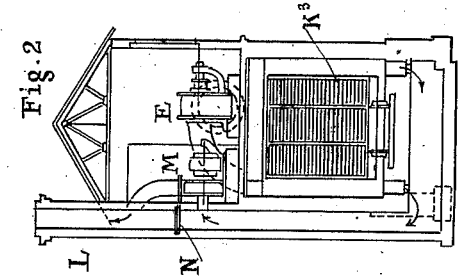
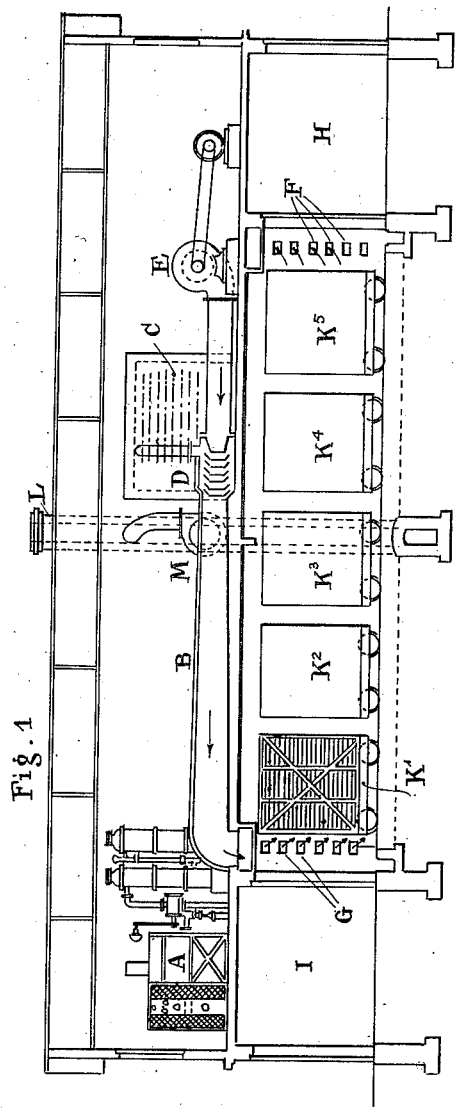
Inventor
Marius Paul Otto
by
his Attorney

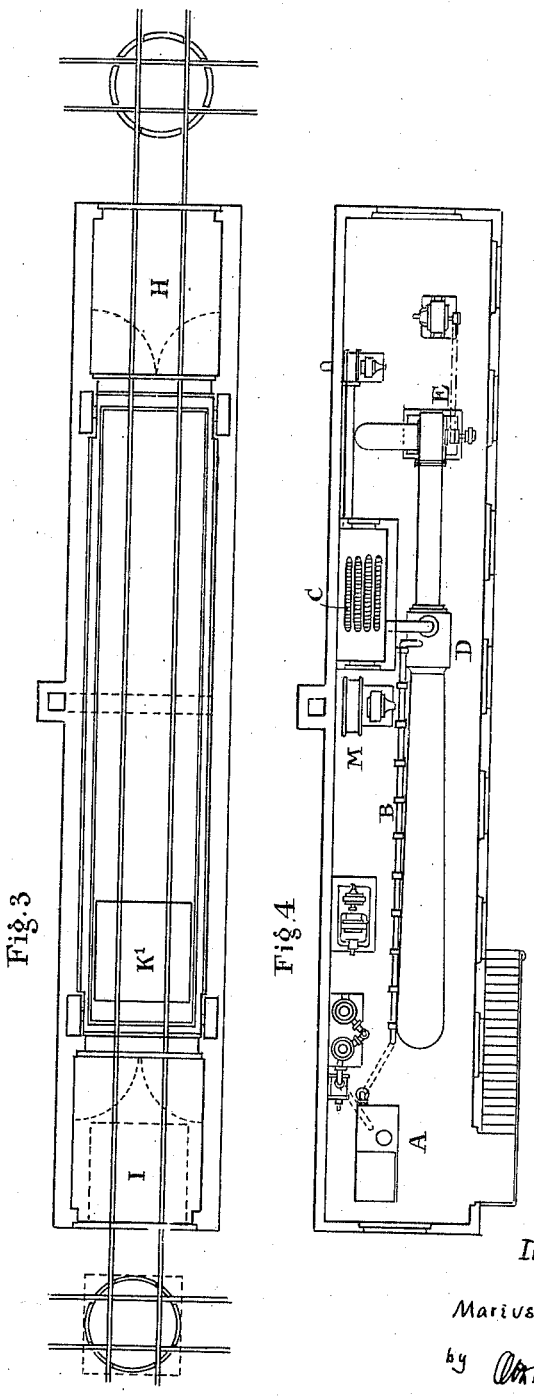

UNITED STATES PATENT OFFICE.

MARIUS-PAUL OTTO, OF PARIS, FRANCE.

TREATMENT OF WOOD FOR SEASONING IT.

1,381,656.  Specification of Letters Patent.  Patented June 14, 1921.

Application filed May 22, 1919. Serial No. 299,061.

*To all whom it may concern:*

Be it known that I, MARIUS-PAUL OTTO, a resident of Paris, in the Republic of France, have invented a new and useful Improved Treatment of Wood for Seasoning It, which invention is fully set forth in the following specification.

This invention relates to improvements in the treatment of wood which is based on the combined use of ozone and heat, and in new apparatus for the practice of this method.

The essential improvement consists in a methodical and continuous circulation of the wood under treatment in the apparatus in which the operation is effected.

The apparatus for practising the method is represented in the accompanying drawings, in which Figure 1 is a longitudinal section through the apparatus; Fig. 2 is a cross section; Fig. 3 is a plan at the ground level and Fig. 4 is a plan at the level of the first floor.

The apparatus comprises the following parts:—An ozone generator A, a duct B for circulating the ozone, a heat generator C, a mixer D, a fan E for producing the circulation, distributing ports F, G, a hot air lock H at the entrance, a hot air lock I at the exit and wagons $K^1$, $K^2$, $K^3$, $K^4$, $K^5$.

The wood to be treated is placed on these wagons, the pieces being separated a distance of one or two centimeters so that the hot air or ozonized air may circulate freely among them.

The two essential elements of the installation are the ozone generator A and the air reheater C.

In the plan, Fig. 4, are shown the ducts which allow the ozonized air and the hot air to mix together before entering the treating chamber.

The intermixture occurs in the mixer D which consists essentially, as shown in section in Fig. 1, of a series of conical nozzles suitably arranged.

The air is circulated by the fan E driven by an electric motor.

This fan draws through the ports F the mixture of ozone and hot air or the ozonized air and hot air separately and discharges it through the ports G as indicated by the arrows.

The excess of air, or spent air, escapes by the chimney L aided or not by a fan M accordingly as the damper N closes the chimney or not.

The operation of the apparatus is as follows:

The wood to be treated, generally veneered some millimeters thick, or planks several millimeters thick, is first piled on the wagons. The latter are then run into the chamber through lock H for the purpose of avoiding loss of hot air or ozone.

When the chamber has received its complement of wagons and the normal operation is established, the wood is submitted successively to the action of hot air alone, of ozonized air alone, and a mixture of ozonized air and hot air together.

By this triple action the wood is dried and the contents of the cells are oxidized, the two operations together reproducing faithfully the natural phenomena which occur when the wood is dried and seasoned in the open-air in a timber yard.

When the operation has been carried sufficiently far, the duration of the process varying naturally with the thickness of the wood under treatment, the first wagon is withdrawn, the doors of the lock I being opened for the purpose.

Another wagon is introduced through the lock H.

The wood is thus systematically treated, being treated the more energetically with the hot air and ozone the more advanced its desiccation and oxidation.

When the apparatus is working normally, the operation is methodical and continuous.

The chambers are generally arranged longitudinally, but they may equally well be grouped in circular form when the accommodation of the installation requires it.

What I claim is:

The herein described process of seasoning wood by the combined action of heat and of ozone, which consists in submitting the wood successively to hot air acting alone, to ozonized air acting alone, and to a mixture of hot air and of ozonized air acting together, and moving the wood during each of these three successive actions in a direction opposite that in which the gaseous current flows.

In testimony whereof I have signed this specification.

MARIUS-PAUL OTTO.

Witnesses:
  HENRI MONIN,
  CHAS. P. PRESSLY